United States Patent [19]
Tugenberg et al.

[11] Patent Number: 5,335,281
[45] Date of Patent: Aug. 2, 1994

[54] NETWORK CONTROLLER AND METHOD

[75] Inventors: Michelle L. Tugenberg; Barry N. Altschuler, both of Scottsdale; Douglas A. Hardy, Mesa, all of Ariz.

[73] Assignee: Motorola, Inc., Schaumburg, Ill.

[21] Appl. No.: 991,056

[22] Filed: Dec. 15, 1992

[51] Int. Cl.$^5$ .............................................. H04K 1/00
[52] U.S. Cl. ...................................... 380/48; 380/23; 370/94.1
[58] Field of Search ................... 380/23, 24, 25, 48, 380/49, 50; 364/229.4, 242.95; 370/92, 93, 94.1; 395/200

[56] References Cited

U.S. PATENT DOCUMENTS

| | | | |
|---|---|---|---|
| 4,578,531 | 3/1986 | Everhart et al. | 178/22.08 |
| 4,888,801 | 5/1988 | Foster et al. | 380/21 |
| 4,962,531 | 10/1990 | Sipman et al. | 380/24 |
| 5,093,860 | 3/1992 | Steinbrenner et al. | 380/21 |

OTHER PUBLICATIONS

An article entitled "The Architectural Elements of a Symmetric Fault-Tolerant Multiprocessor", by A. Hopkins, Jr. and T. Smith III, IEEE Trans. Comp., vol. C-24, No. 5, pp. 498-505.

Primary Examiner—Tod R. Swann
Attorney, Agent, or Firm—Frederick M. Fliegel

[57] ABSTRACT

A method for passing supervisory control from a first station to a second station of a plurality of stations comprises steps of providing a message header in interstation messages in the first station, transmitting the interstation message from the first station to the second station, processing a message header from the interstation message to extract data and determining present identification of a system controller from the extracted data. The method includes steps of providing a first field containing message identification information, providing a second field containing supervisor station identification information, providing a third field containing update count information and providing a fourth field containing sending station identification information in the message header.

20 Claims, 2 Drawing Sheets

NETWORK CONTROLLER AND METHOD

LICENSE RIGHTS

The U.S. Government has a paid-up license in this invention and the right in limited circumstances to require the patent owner to license others on reasonable terms as provided for by the terms of Subcontract No. 7-AB1799-R-LR7 pursuant to Contract No. F19628-91-C-0124 awarded by the United States Air Force.

This application is related to co-pending U.S. patent application Ser. No. 07/767,706, filed on Sep. 30, 1991, now U.S. Pat. No. 5,195,136; Ser. No. 07/777,870, filed on Oct. 16, 1991, now U.S. Pat. No. 5,179,591; Ser. No. 07/954,205, filed on Sep. 30, 1992, now U.S. Pat. No. 5,230,020; and to Ser. No. 07/991,054, filed on Dec. 15, 1992, which are all assigned to the same assignee as the present application and which are hereby incorporated by reference.

FIELD OF THE INVENTION

This invention relates in general to the field of hierarchy definition, in particular to gracefully altering a hierarchy and more particularly to determining a current controller for a group of machines.

BACKGROUND OF THE INVENTION

Hierarchy definition is important for many electronic products requiring coordination among a plurality of devices. Designation of a particular device or terminal as a controller allows ready synchronization of passwords, for example, in networks employing password security by assuring that all of the plurality of devices employ a common password distributed from a common source such as the controller. An example of such a system is described, for example, in "Encryption System Key Distribution Method and Apparatus", U.S. Pat. No. 4,578,531, by J. Everhard and J Osborn; in "Key Management System" U.S. Pat. No. 5,093,860, by K. Stienbrenner and M. Bright; in "Transaction System Comprising One Or More Host Exchanges And A Number of Distributed Terminal Stations", U.S. Pat. No. 4,962,531, by W. Sipman and L. Snel; or in "Hierarchical Key Management System", U.S. Pat. No. 4,888,801, by R Foster, R. Pfeifer and T. Mihm, which patents are hereby incorporated by reference.

"Voting" systems are used in high reliability applications wherein a plurality of computing devices, for example, each independently perform similar operations on nominally identical data, as described, for example, in "The Architectural Elements of a Symmetric Fault-Tolerant Multiprocessor" by A. Hopkins, Jr . and T. Smith III (IEEE Trans. Comp., Vol C-24, No. 5, pp. 498 through 505) which is hereby incorporated by reference. Such systems suffer from lack of techniques for determining control when N−1 of N many computing devices are faulty. As well, no capability for changing a password, for example, is provided in such a system.

It has been especially uneconomical and impractical to provide for changes in hierarchy in secure communications networks . Typically, such a network may have N many communications units coupled to one another wherein one of the N is the network controller (e.g., authorized key distribution center or key certification authority). In the event that the network controller malfunctions, communications stop and are resumed only when the defect in the network controller has been cleared. This type of network control method provides effective security by cannot gracefully accommodate need to alter the identity of the controlling element, which need may be engendered by disruption of communications or by failure of the controlling element in the network.

Thus, what is needed are a practical and economical method for determining and/or changing an hierarchy and an apparatus for implementing the method, particularly in an environment where the number of elements may change with time and especially in secure communications networks.

SUMMARY OF THE INVENTION

Accordingly, there is provided a new and improved communications network comprising a receiver for receiving a first message header having first, second, third and fourth fields, a memory for storing information and a processor coupled to the receiver and to the memory. The processor compares the first, second, third and fourth fields from a received message to stored information from the memory. The communications network further comprises a memory updating device coupled to the processor, for updating information stored in the memory in response to signals from the processor.

The first field desirably but not essentially comprises eight bytes, the second field desirably but not essentially comprises sixty-four bytes, the third field desirably but not essentially comprises four bytes and the fourth field desirably but not essentially comprises sixty-four bytes, each byte comprising eight bits.

The processor desirably but not essentially compares the second field data to the stored supervisor station identification if the information from the third field is equal to the stored update count and ignores the message if the stored supervisor station identification does not agree with the second field data.

The processor desirably but not essentially compares information from the third field to a stored update count and updates and stores the stored update count and supervisor station identification if the information from the third field exceeds the stored update count.

A message header is desirably realized including at least a first field containing message identification information, a second field containing supervisor station identification information, a third field containing update count information and a fourth field containing sending station identification information. The message header further comprises a fifth field containing a message.

The present invention further provides a method for passing supervisory control from a first station to a second station of a network comprising a plurality of stations. The method comprises steps of providing a message header in all interstation messages, processing received message headers to extract data and determining present identification of a network controller from the extracted data.

The method desirably but not essentially includes steps of providing a first field containing message identification information, providing a second field containing supervisor station identification information, providing a third field containing update count information and providing a fourth field containing sending station identification information.

BRIEF DESCRIPTION OF THE DRAWINGS

A more complete understanding of the present invention may be derived by referring to the detailed description and claims when considered in connection with the figures, wherein like reference numbers refer to similar items throughout the figures, and:

DETAILED DESCRIPTION OF THE DRAWINGS

Figure 1:
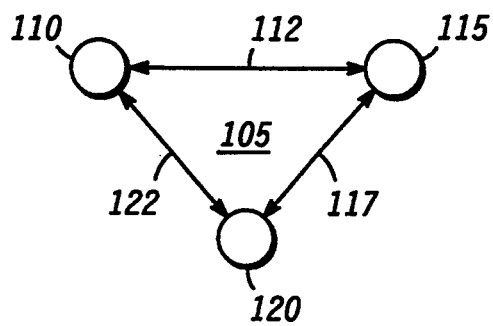
FIG. 1 is a simplified block diagram of a multi-element network of communications terminals in accordance with the present invention.

FIG. 1 is a simplified block diagram of multi-element network 105 comprising stations 110, 115 and 120 and having interconnections 112, 117 and 122 in accordance with the present invention. Interconnections 112, 117 and 122 may allow bidirectional or unidirectional communication. Interconnection 112 couples stations 110 and 115; interconnection 117 couples stations 115 and 120; and interconnection 122 couples stations 120 and 110. While only three stations 110, 115 and 120 and only three interconnections 112, 117 and 122 are shown in FIG. 1 for brevity, ease of illustration and ready understanding, those of skill in the relevant arts will readily appreciate that arbitrary numbers of stations and interconnections may operate in accordance with the principles and teachings of the present invention and further that the number of stations comprising the network need not be fixed (i.e., stations may be added or deleted from the network as time passes).

Figure 2:
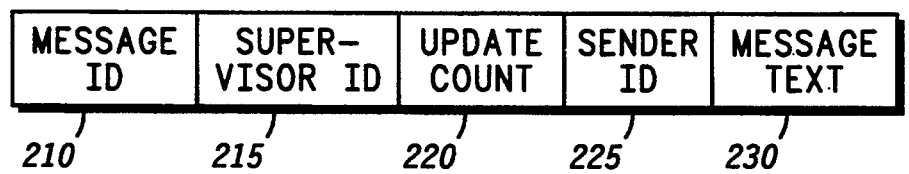
FIG. 2 is a sketch illustrating first, second, third, fourth and fifth fields contained in a message header in accordance with the present invention.

FIG. 2 is a sketch illustrating first, second, third, fourth and fifth fields 210, 215, 220, 225 and 230, respectively, contained in message header 205 in accordance with the present invention.

First field 210 comprises a first fixed field length comprising a predetermined number of bits and/or bytes identifying the type or purpose of the message. Examples of message types, message contents and/or purposes include but are not limited to key management information, passwords and/or status.

Second field 215 comprises a second fixed field length of data identifying which station the sending station characterizes as being the network controller.

Third field 220 comprises a third fixed field length and provides an update count. This information is used to determine whether the sending station or the receiving station has been updated most recently. The update count information is employed to resolve ambiguities in the event that the sending and receiving stations do not agree as to the identity of the current network supervisor or controller.

Fourth field 225 comprises a fourth fixed field length and provides information labelling the identity of the sending station.

Fifth field 230 is of arbitrary length (i.e., may vary from one message to another; a length for fifth field 230 is specified in first field 210) and contains text or other information contained in any message(s) being sent. Such messages may convey key management information, passwords and/or status, for example.

In one embodiment of the present invention, all stations in the network or system are initialized by sending to each non-supervisory station an initial message containing identical or similar header information. The individual stations then employ the header information to verify that the sending station is operating under the same supervisor or controller that the receiving stations are operating under.

If a station receives a message transmitted from a station operating under a different supervisor, the receiving station is able to determine which of the sending and receiving stations has the most recent supervisory station information. This is determined by comparing the update count in the most recently received message header with the update count stored in the receiving station(s). The receiving station(s) may then use this information to decide whether to accept or discard the received message.

Figure 3:
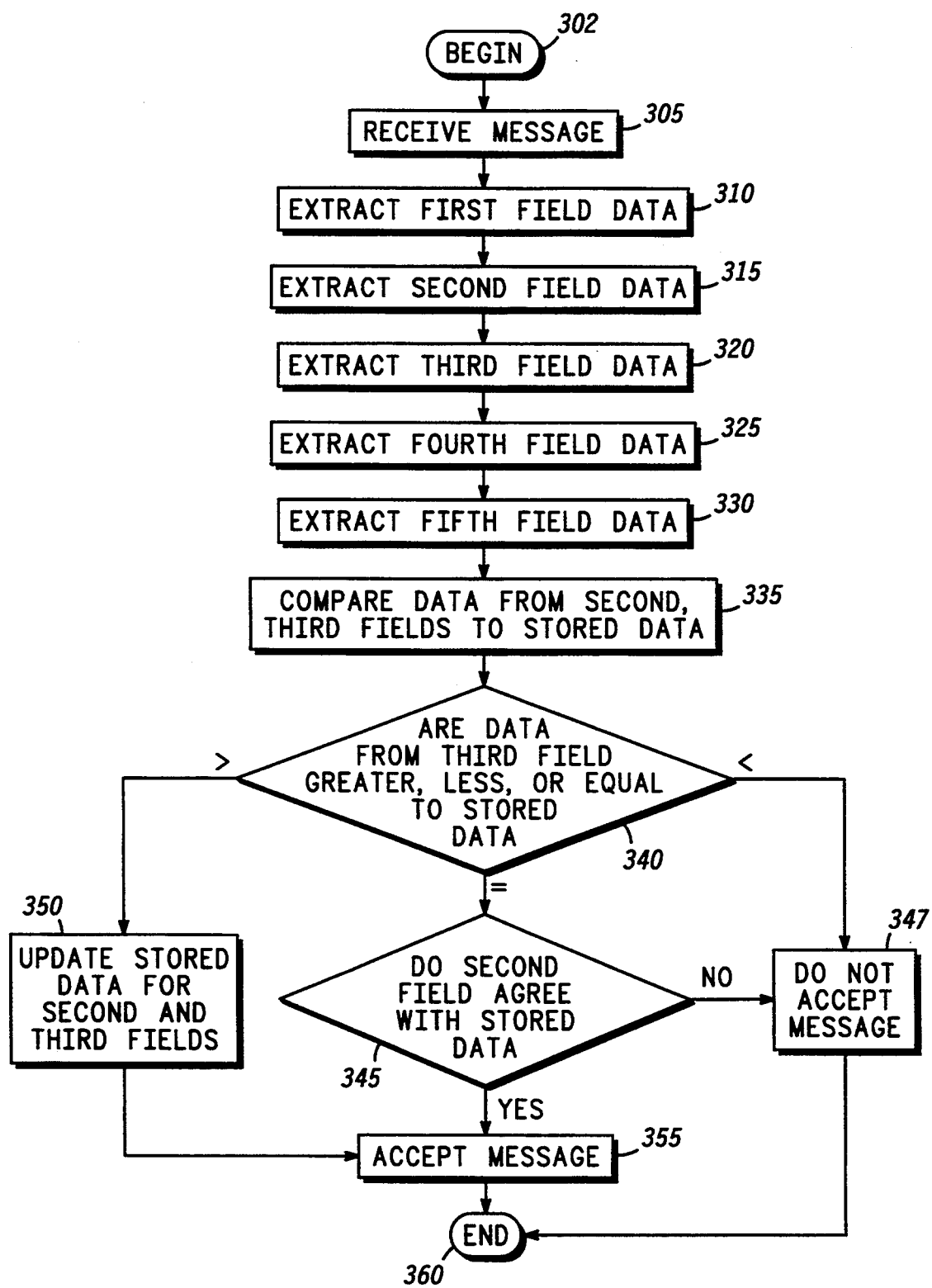
FIG. 3 is a flow diagram of a method for changing controllers in accordance with the present invention.

FIG. 3 is a flow diagram of a method for changing controllers in accordance with the present invention. The method of FIG. 3 begins (block 302) with receipt of a message (block 305). The received message is parsed to recover data (block 310) from first field 210 (FIG. 2), (block 315) second field 215, (block 320) third field 220, (block 325) fourth field 225 and (block 330) fifth field 230 (if the fifth field is present). Data from second field 220 and third field 225 are compared to stored data (block 335) to determine whether or not the sending and receiving stations recognize the same station as the supervising station and to determine whether the received or the stored update count is larger.

Data extracted from third field 220 are compared to stored update count data (block 340) to determine whether data extracted from third field 220 are greater than, equal to or less than the stored update count data.

If data extracted from received third field 220 (i.e., the received update count) exceed stored update count information, the sending station has more recent supervisor station information and the stored second and third field data are updated with values extracted from the received second field 215 and third field 220, respectively (block 350). The received message is then accepted (block 355) and the transaction is terminated (block 360).

If data extracted from received third field 220 are less than stored update count information, the message is not accepted (block 347) and the transaction is terminated (block 360).

If data extracted from received third field 220 are equal to stored update count information, data from received second field 215 are tested (block 345).

Data extracted from received second field 215 are compared to stored supervisor station identification data (block 345) to determine whether data extracted from received second field 215 agree or disagree with stored data identifying the controlling station.

If agreement obtains between stored data identifying the controlling station and data extracted from received second field 215, the two stations agree as to the controlling station's identity. The received message is then accepted (block 355) and the transaction is subsequently terminated (block 360).

If disagreement obtains between stored data identifying the controlling station and data extracted from received second field 215, the two stations disagree on the controlling station's identity. The received message is not accepted (block 347) and the transaction is terminated (block 360).

Figure 4:
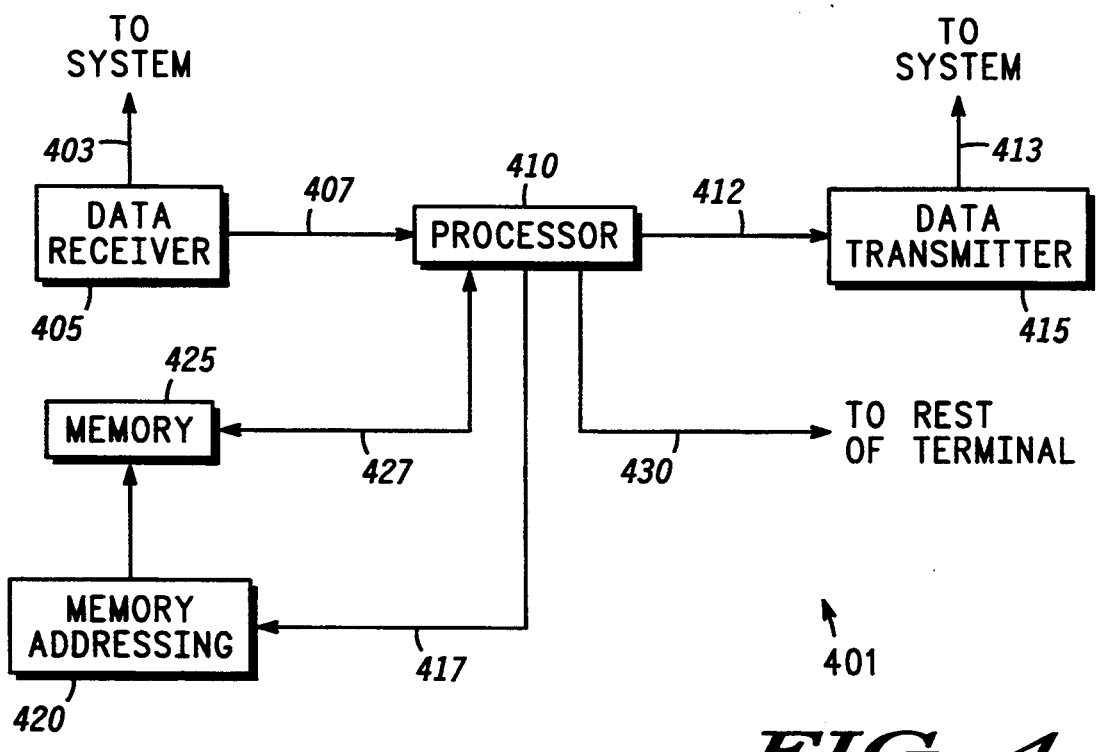
FIG. 4 is a block diagram of a portion of a terminal in accordance with the present invention.

FIG. 4 is a block diagram of portion 401 of a terminal (e.g., 110, 115 and/or 120, FIG. 1) in accordance with the present invention. Portion 401 (FIG. 4) comprises connections 403 and 413 for receiving and transmitting data, respectively. Connections 403 and 413 together are analogous, for example, to any of interconnections 112, 117 and/or 122 (FIG. 1). Connection 403 (FIG. 4) couples data receiver 405 to network 105 (FIG. 1), for example, while connection 413 (FIG. 4) couples data transmitter 415 to network 105 (FIG. 1), for example.

Data receiver 405 is coupled via interconnection 407 to processor 410 while data transmitter 415 is coupled via interconnection 412 to processor 410. Processor 410 is also coupled to memory addressing unit 420 via interconnection 417 and to memory 425 via interconnection 427.

Processor 410 is thus able to read and/or write data from or to memory 425 in response to messages received by data receiver 405. Processor 410 may also transmit data to the rest of the network (e.g., network 105, FIG. 1) via data transmitter 415 and interconnections 412 and 413. Processor 410 is also coupled to the remainder of the terminal (e.g., terminal 110, 115 and/or 120, FIG. 1) via interconnection 430.

Processor 410 parses message header 205 (FIG. 2) from a message received by data receiver 405 in accordance with procedures described in the discussion of FIG. 3 (supra). Stored data from memory 425 are compared to data extracted from message header 205 by processor 410 and data stored in memory 425 may be altered by processor 410 in response to the results of comparing the received and stored data.

Similarly, processor 410 can compose a message including a header (e.g., 205 of FIG. 2) for transmission to other network elements (e.g., terminals 110, 115 and/or 120, FIG. 1) via interconnections 412 and 413 and data transmitter 415.

EXAMPLE

Referring again to FIG. 1, terminals 110, 115 and 120 may comprise HP 720 workstations available from Hewlett Packard of Palo Alto, Calif., operating under a UNIX operating system. Other apparatus (e.g., Sun, Apollo, etc. workstations) are also suitable for use with the present invention and other operating systems (e.g., DOS, etc.) are also suitable for use with the present invention. Interconnections 112, 117 and 122 may comprise, by way of example and not intended to be limiting, dedicated wires, fiber optic links, radio links and/or telephone lines or a mixture of transmissive media.

Referring now to FIG. 2, first field 210 of message header 205 comprises eight bytes of data identifying the type or purpose of the message. The term "byte" is used in this example to represent a group of eight bits.

Second field 215 comprises 64 bytes of data identifying which station of the network the sending station characterizes as the network controller.

Third field 220 comprises four bytes of data and provides an update count from the sending station.

Fourth field 225 comprises 64 bytes of data providing the identity of the sending station.

The first through fourth fields are of fixed length and so no particular field delimiters are necessary; data are parsed into particular fields or information categories based on where the data occur in a particular message header.

Fifth field 230 is of arbitrary length (fifth field 230 may vary in length from one message to another and the length of this field is specified in first field 210) and contains text or other information contained in any message(s) being sent. Types of data that fifth field 230 may contain in this context include instruction to switch controller identities (switchover), database update information, supervisor status information and/or a request or a response to a request for status of a particular remote station, for example.

Referring again back to FIG. 1, terminal 110 may, by way of example, be initially designated as network controller. In this case, message headers will initially identify terminal 110 in field 2. An example of such a message header sent from station 120 to station 115, broken down into fields, might be:

Message ID="B"
Supervisor station ID=110
Update count=1
Sending station=120
Message text=Message B, where Message B is an arbitrary message not involving a change of supervisor station identity. If station 115 is to assume the network supervisor function, station 115 could perform the switchover by sending, for example, the following message to station 110 and station 120:

Message ID="A"
Supervisor station ID=115
Update count=2
Sending station=115
Message text=Message A, where message A is a message intended to switch network supervisor station identity.

This message, if received by station 110 and station 120, causes these stations to recognize station 115 as network supervisor.

If station 120, for example, did not receive the switchover message, it would know that a transfer of supervisory function had occurred and station 120 would also determine the identity of the new supervisory station as soon as it received any message from another station which had received the switchover message. At this point station 120 can take whatever action is required in order to make station 120 current with the present network configuration.

Thus, a method and apparatus have been described which overcome specific problems and accomplish certain advantages relative to prior art methods and mechanisms. The improvements over known technology are significant. Similarly, supervisory control is gracefully changed without compromise of network integrity or performance by an automatic hierarchical process.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

We claim:

1. A method for passing supervisory control from a first station to a second station of a plurality of stations, said method comprising steps of:
   (a) providing in the first station a message header having a first field containing message identification information, a second field containing supervisor station identification information, a third field comprising update count information and a fourth field comprising sending station identification information in an interstation message;
   (b) communicating the interstation message from the first station to the second station;
   (c) processing in the second station a received message header from the interstation message to extract message identification information, supervisor station identification information, update count information and sending station identification information from the first through fourth fields of the received message header;
   (d) comparing the extracted supervisor station identification information to stored supervisor station information to obtain an initial agreement when the extracted and the stored supervisor station identification information agree; and
   (e) determining in the second station a present identification of a network controller from the extracted data.

2. A method as claimed in claim 1, further comprising steps of:
   comparing the extracted update count information to stored update count information to obtain a further agreement, when the extracted and the stored update count informations agree; and
   accepting the interstation message when the first and second agreements obtain.

3. A method as claimed in claim 1, further comprising steps of:
   comparing the extracted update count information to stored update count information to obtain a disagreement when the extracted and stored update count informations disagree; and
   updating the stored update count with the extracted update count information and updating the stored supervisor station identification with the extracted supervisor station identification when the disagreement obtains and when the extracted update count is greater than the stored update count.

4. A method for passing supervisory control from a first station to a second station of a plurality of stations, said method comprising steps of:
   (a) providing a message header in an interstation message;
   (b) transmitting the interstation message from the first station to the second station;
   (c) receiving the interstation message in the second station;
   (d) processing in the second station a received message header from the interstation message to extract data; and
   (e) determining in the second station the present identification of a network controller from the extracted data, wherein:
   said step (a) further comprises substeps of:
   (a1) providing in the message header a first field containing message identification information;
   (a2) providing in the message header a second field containing supervisor station identification information;
   (a3) providing in the message header a third field comprising update count information; and
   (a4) providing in the message header a fourth field comprising sending station identification information;
   and said step (d) comprises substeps of:
   (d1) extracting message identification information from the first field of the received message header to provide extracted message identification information;
   (d2) extracting supervisor station identification information from the second field of the received message header to provide extracted supervisor station identification information;
   (d3) extracting update count information from the third field of the received message header to provide extracted update count information; and
   (d4) extracting sending station identification information from a fourth field of the received message header to provide extracted sending station identification;
   (d5) comparing the extracted update count information to stored update count information to obtain a first agreement, when the extracted and the stored update count informations agree;
   (d6) comparing the extracted update count information to stored update count information to obtain a first disagreement, when the extracted and stored update count informations disagree;
   (d7) comparing the extracted supervisor station identification information to stored supervisor station information to obtain a second agreement, when the extracted and the stored supervisor station identification information agree; and
   (d8) comparing the extracted supervisor station identification information to stored supervisor station information to obtain a second disagreement, when the extracted and stored supervisor station identification information disagree.

5. A method as claimed in claim 4, wherein said step (a) further comprises a substep (a5) of providing in the message header a fifth field containing a message.

6. A method as claimed in claim 4, further comprising a step of accepting the interstation message when the first and second agreements obtain.

7. A method as claimed in claim 4, further comprising a step of updating the stored update count with the extracted update count information and updating the stored supervisor station identification with the extracted supervisor station identification when the first disagreement obtains and when the extracted update count is greater than the stored update count.

8. A method as claimed in claim 4, further comprising a step of rejecting the interstation message when the first agreement and the second disagreement obtain.

9. A method as claimed in claim 4, further comprising a step of rejecting the interstation message, when the first disagreement obtains and when the extracted update count is less than the stored update count.

10. A communications network including at least a first terminal, said terminal comprising:
    means for receiving a first message including a first message header, said first message header having first, second, third and fourth fields, said first field containing information describing message identification, said second field containing information describing supervisor station identification, said third field containing information describing an update count, said fourth field containing information describing sending station identification;

means for storing information, said stored information describing message identification, supervisor station identification, update count and sending station identities;

means, coupled to said receiving means and to said storing means, for comparing said second and third fields from a received message to stored information from said means for storing information; and means, coupled to said means for comparing, for updating information stored in said means for storing information in response to signals from said means for comparing.

11. A communications network as claimed in claim 10, wherein:
said means for comparing compares said information from said third field to a stored update count;
said means for updating information updates said stored update count and supervisor station identification; and
said means for storing information stores said updated update count and updated supervisor station identification when said information from said third field exceeds said stored update count.

12. A communications network as claimed in claim 10, wherein:
said means for comparing compares said information from said third field to a stored update count;
said means for comparing compares said second field data to said stored supervisor station identification when said information from said third field is equal to said stored update count; and
means for rejecting said first message when said second field data do not agree with said stored supervisor station identification and said third field data agree with said stored update count.

13. A communications network as claimed in claim 10, wherein:
said first field comprises at least eight bytes, each byte comprising at least eight bits; and
said second field comprises at least sixty-four bytes, each byte comprising at least eight bits.

14. A communications network as claimed in claim 10, wherein:
said third field comprises at least four bytes, each byte comprising at least eight bits; and
said fourth field comprises at least sixty-four bytes, each byte comprising at least eight bits.

15. A communications system comprising a first terminal and a second terminal, each of said first and second terminals comprising a data transceiver for sending and receiving messages including a message header, a memory for storing data including received messages and a processor for comparing portions of received messages including said message header to data stored in said memory, wherein said message header comprises a first field containing message identification information, a second field containing supervisor station identification information, a third field containing update count information and a fourth field containing sending station identification information, wherein said processor compares said second and third fields from said received message to data stored in said memory and said processor updates said data stored in said memory in response thereto.

16. A communications system as claimed in claim 15, further comprising a fifth field containing a message.

17. A communications system as claimed in claim 15, wherein said first field comprises up to eight bytes.

18. A communications system as claimed in claim 15, wherein said second field comprises up to sixty-four bytes.

19. A communications system as claimed in claim 15, wherein said third field comprises up to four bytes.

20. A communications system as claimed in claim 15, wherein said fourth field comprises up to sixty-four bytes.

* * * * *